UNITED STATES PATENT OFFICE.

OTTO CLAUDE IMMISCH, OF FINCHLEY, ENGLAND.

MANUFACTURE OF EBONITE AND VULCANITE.

937,745.

Specification of Letters Patent. Patented Oct. 19, 1909.

No Drawing. Application filed February 19, 1909. Serial No. 478,963.

*To all whom it may concern:*

Be it known that I, OTTO CLAUDE IMMISCH, a subject of the King of Great Britain, residing at 4 Woodside Park road, Finchley, Middlesex, England, have invented new and useful Improvements in the Manufacture of Ebonite and Vulcanite; and I do hereby declare that the following is a full, clear, and exact description of the invention, which will enable others skilled in the art to which it appertains to make and use the same.

My invention relates to the manufacture of goods of various kinds and shapes from old or waste ebonite or vulcanite and to that process of manufacture wherein the waste material, in a divided state, is subjected to heat and pressure, the object of my invention being to produce articles which possess all the qualities of the original material. The process by which this result is attained is as follows:—The waste ebonite is reduced to small particles in such a way that the bulk unit of weight of the reduced material is, when not compressed, considerably larger than that obtained by pulverizing or grinding so that they are in a friable condition. Turnings or shavings of the material are suitable for my purpose. The reduced material is placed in a mold, preferably cold, having larger capacity than the column of the article required, say in the direction of its longest dimension. By suitable means the material in the mold is then subjected to a high pressure and, by the use of a clamp or similar means, the pressure is retained. The mold is then placed in an oven and slowly reheated to a temperature of about 280° Fahrenheit for a time depending upon the dimensions and weight of the mold. This preliminary pressing and heating may in some instances be repeated with advantage before subjecting the material to the higher temperature hereinafter mentioned. While still hot, the mold is removed from the oven and, while the mold is cooling, the material is further compressed so that its volume shall be approximately that of the required article. The mold is then clamped and replaced in the oven and heated to a temperature of over 400° Fahrenheit, the temperature varying with the quality of the waste ebonite, and the time depending upon the weight and dimensions of the mold as before mentioned. After this temperature has been attained, the mold is removed from the oven and allowed to cool down slowly, when the clamp may be removed and the article taken out of the mold.

In the case of the finished article weighing about a quarter of a pound I have obtained good results by first subjecting the material in the mold while cold, to a pressure of 600 atmospheres and, retaining this pressure by means of a clamp, raising the temperature of the mold to 280° F. in 30 minutes. I then remove the mold from the oven and subject the material to a pressure between 500 and 600 atmospheres, and maintain this pressure by suitable means for about 15 minutes, by which time the mold should have cooled down considerably. I then tighten the clamp and replace the mold in the oven, and gradually heat it to a temperature of 440° F. in about 40 minutes. I then remove the mold from the oven, and allow it to cool slowly, after which I open the mold and remove the article.

In the manufacture of small articles where the density of the ebonite is not of importance, the waste material can be reformed without the preliminary heating referred to above:—the material while under pressure in a clamped mold being slowly heated to a temperature of between 400° and 440° Fah., but unless the initial pressure exceeds the pressure stated above, the density of the finished article will be lower and the structure imperfect. I have found it necessary to use a temperature of between 400° and 440° F., in order that the structure of the reformed ebonite, as shown on fracture, shall be similar to that of the original material. As is well known sulfur, when heated to a temperature of between 400° and 440° Fah., undergoes a physical change becoming soft and pasty, but recovering its original hardness when cooled slowly. The same physical change occurs in ebonite at about the same temperature. The effect of the high pressure, due to the expanding force of the confined material (when heated in a closed mold) on the particles forming such mass when in the plastic state, causes complete coalescence of the particles.

In order to avoid injuries to the mold through any exceptional pressure arising from the expansion of the heated material I find that, in the manufacture of articles of large dimensions, it is desirable to provide means, such as a spring for taking up any excessive pressure above that which the clamp is intended to retain.

Having now particularly described and ascertained the nature of my said invention and in what manner the same is to be performed, I declare that what I claim is:—

1. In the manufacture of articles from waste ebonite and vulcanite, the process which consists in reducing such waste material to a condition in which the individual units are considerably larger than those of a granulated or pulverized condition, placing such material in a mold and subjecting the same to high pressure, then subjecting the mold and its compressed contents to a temperature of about 280° F., then further compressing the material to approximately the volume required for the finished article and then again subjecting the mold and its compressed contents to a temperature of about 400° F.

2. In the manufacture of articles from waste ebonite and vulcanite, the process which consists in reducing such waste material to a condition in which the individual units are considerably larger than those of a granulated or pulverized condition, placing such material in a mold and subjecting the same to high pressure without heat, then subjecting the mold and its compressed contents to a temperature of about 280° F., then removing the mold from the influence of heat and while cooling subjecting the material in the mold to a further compression and then again subjecting the mold and its compressed contents to a temperature of about 400° F.

OTTO CLAUDE IMMISCH.

Witnesses:
JOHN E. BOUSFIELD,
C. G. REDFERN.